(12) United States Patent
Alur et al.

(10) Patent No.: US 8,142,878 B2
(45) Date of Patent: Mar. 27, 2012

(54) HEAT RESISTANT HALOGEN FREE SUBSTRATE CORE MATERIAL

(75) Inventors: Amruthavalli P. Alur, Chandler, AZ (US); Omar J. Bchir, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 1192 days.

(21) Appl. No.: 11/894,956

(22) Filed: Aug. 22, 2007

(65) Prior Publication Data

US 2009/0053466 A1 Feb. 26, 2009

(51) Int. Cl.
B32B 3/24 (2006.01)

(52) U.S. Cl. ........ 428/137; 428/131; 428/138; 428/901; 428/208; 428/209; 428/147; 428/407; 174/258

(58) Field of Classification Search .................. 428/131, 428/138, 137, 901, 208, 209, 147, 407; 174/258
See application file for complete search history.

(56) References Cited

U.S. PATENT DOCUMENTS

| | | | | |
|---|---|---|---|---|
| 4,105,465 A | * | 8/1978 | Berger | 106/481 |
| 5,270,105 A | * | 12/1993 | Conroy et al. | 442/136 |
| 5,312,691 A | * | 5/1994 | Even et al. | 428/458 |
| 2004/0076805 A1 | * | 4/2004 | Oohori et al. | 428/209 |
| 2006/0118766 A1 | * | 6/2006 | Koes et al. | 252/500 |

OTHER PUBLICATIONS

U.S. Appl. No. 11/824,212, filed Jun. 29, 2007, entitled "Forming Vias Using Sacrificial Material," by Lakshmi Supriya and Omar J. Bchir.
Akrochem Corporation, "Akrochem Zinc Borate HT," Mar. 27, 2003, 1 page.
A, Riva, et al., "Intumescent Ethylene Vinyl Acetate Compositions," Polym. Degrad. Stab., 82:341, 2003, 1 page showing figure.
K.H. Hsieh, et al., "Cyclopolymerization and Polymers with Chain-Ring Structures," ACS Symposium, Series 195, 1982, 1 page showing figure.
Reinforced Plastics/Composites Institute, The Society of the Plastics Industry, 30th Anniversary Technical Conference, 1975, 1 page showing figure.

* cited by examiner

*Primary Examiner* — William P Watkins, III
(74) *Attorney, Agent, or Firm* — Trop, Pruner & Hu, P.C.

(57) ABSTRACT

In one embodiment, a substrate includes a core material formed from a filler including aluminum trihydrate and a secondary filler material. The secondary filler material has a secondary decomposition reaction that occurs at a temperature higher than a reflow temperature reached during processing of the substrate, or the secondary filler traps water released at reflow temperature by aluminum trihydrate. Other embodiments are described and claimed.

9 Claims, 2 Drawing Sheets

HEAT RESISTANT HALOGEN FREE SUBSTRATE CORE MATERIAL

BACKGROUND

Semiconductor packages typically include a so-called package substrate on which a semiconductor die is adapted. Many such package substrates as well as other substrates are formed of a core material. Historically, this core material has been made with a halogenated flame retardant material.

More recently, halogen free (HF) core materials had been introduced, which typically include aluminum trihydrate $Al(OH)_3$ as a flame retardant. Aluminum trihydrate functions by releasing water to quench flames and thus acts as a flame retardant. However, aluminum trihydrate begins to decompose at solder reflow temperatures used in processing the substrates. As such, if its water of hydration is released, this release can cause delamination and blistering on the HF substrate at reflow temperatures. Such delamination/blistering can lead to unacceptable yields, as well as device failures.

DETAILED DESCRIPTION

Figure 1:
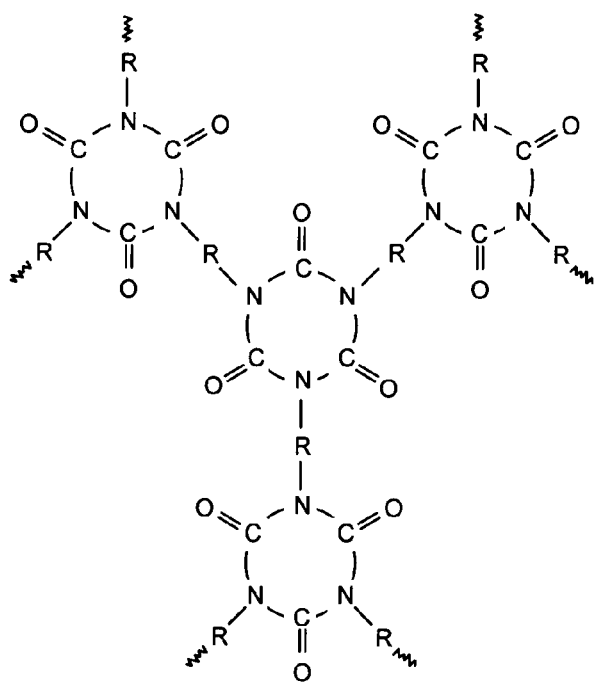
FIG. 1 is a chemical structure used in accordance with one embodiment of the present invention.

In various embodiments, different filler materials may be used to form a core portion of a substrate that is both halogen free and able to provide heat resistance as well as reduced delamination/blistering of the core material. In various embodiments, different such filler materials or compositions may be provided to enable formation of such substrates. In one embodiment, an optimum amount of clay may be added to an aluminum trihydrate filler material. Examples of clay that can be used to absorb the water released are Montmorillonite, Bentonite and Kaolinite. The clay may be used to absorb any water of hydration released as part of a secondary decomposition reaction during reflow conditions. For example, aluminum trihydrate may release water of hydration during lead (Pb)-free reflow, which may occur at temperatures of less than approximately 260° Celsius (C.), oftentimes at temperatures of approximately 245° C.

In such an implementation, any water of hydration released during a reflow process may completely saturate the clay in the core material such that any further water released at higher temperatures can act as a flame retardant. In some embodiments, the optimum amount of clay may be between approximately 2 and 5 percent per volume.

While the scope of the present invention is not limited in this regard, in some implementations a core material may be formed as follows. Fillers particles are mixed with organic epoxy resin, appropriate hardener, solvent and mixed uniformly by a suitable means to ensure uniform distribution of the fillers in the resin. Glass cloth of a given thickness is then dipped into the resin mixture and semi-cured in order to produce prepreg (B-stage) of the core material. Depending on the thickness of the core material needed, a number of prepregs are laid on top of each other and laminated with copper foil and in the process completely curing the core material to produce a copper clad core material in its final form.

In other embodiments, rather than aluminum trihydrate, a different filler material may be used. For example, in one embodiment hydrotalcite, which is a double layered magnesium (Mg) and aluminum trihydrate, exhibits no secondary reactions at reflow temperatures. However, its water of hydration may be released at approximately 320° C., enabling it to function as a flame retardant. In some embodiments, it may not release its water of hydration until its temperature is approximately 353° C.

In yet other embodiments, a combination of zinc borate (e.g., $4ZnO.6B_2O_3.7H_2O$) may be included with aluminum trihydrate as a filler material. Accordingly, a lesser volume fraction of aluminum trihydrate may be needed. In some embodiments, relative compositions of zinc borate and aluminum trihydrate may vary from between approximately 2 weight (wt) and 12 wt percent zinc borate and 5 wt and 8 wt percent aluminum trihydrate, respectively. By using a lesser volume fraction of aluminum trihydrate, a reduction of water of hydration that occurs at lower temperatures may be realized, as zinc borate may decompose at approximately 290° C. to release water of hydration.

In still other embodiments, aluminum trihydrate filler material may be coated with a polymer that decomposes at temperatures higher than any reflow temperature. Accordingly, the secondary reaction of aluminum hydroxide that occurs at temperatures lower than reflow temperature may be prevented. In turn, water of hydration is not released, improving heat resistance of the core material. In one embodiment, the polymer material may be polyisocyanurate, which decomposes at 325° C., a chemical structure of which is shown in FIG. 1. Accordingly, at these higher temperatures, the aluminum trihydrate may release the water of hydration, to act as a flame retardant. While in one embodiment the polymer may be a thermoset polymer such as polyisocyanurate, the scope of the present invention is not limited in this regard. Note that the polymer coating on such an aluminum trihydrate core material merely suppresses the secondary reaction from occurring at the lower temperature, as it protects the aluminum trihydrate from being exposed to reflow temperatures.

Figure 2:
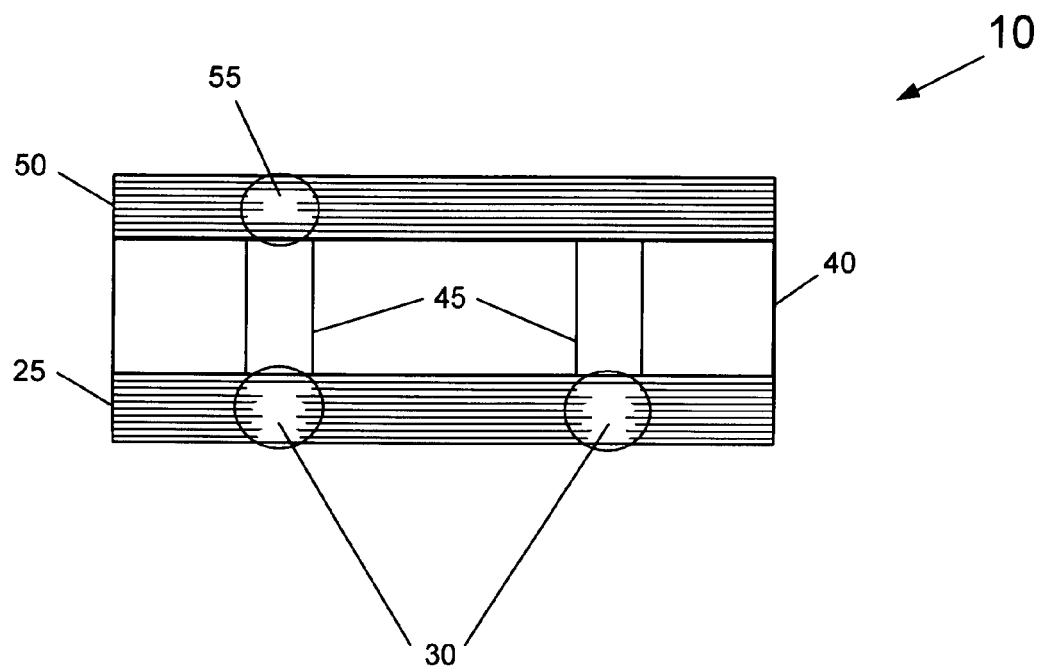
FIG. 2 is a cross-section view of a substrate in accordance with an embodiment of the present invention.

While the scope of the present invention is not limited in this regard, some embodiments may be implemented in a core material for a package substrate. Referring now to FIG. 2, shown is a cross-section view of a substrate in accordance with an embodiment of the present invention. As shown in FIG. 2, substrate 10 may include a core material 40 in accordance with an embodiment of the present invention. For example, core material 40 may be a HF material, containing aluminum trihydrate flame retardant and a secondary filler or coating. Connections may be made through core material 40 by a plurality of PTHs 45.

Various buildup (BU) layers may be formed on either side of core material 40. For example, as shown in FIG. 2, a plurality of conductive planes 25, which in some embodiments may be copper (Cu) planes may be present on a first side of core material 40. Between conductive planes 25, dielectric layers may be present, such as formed using a polymer. Contacts may be made between conductive plates 25 by a plurality of microvias 30, which can be formed in various manners.

Similarly, on a second side of core material 40, conductive planes may be present with dielectric layers 50 separating them. Microvias 30 and 55 are formed in the BU dielectric layers to make electrical connections between the metal layers in the buildup, and are typically metallized using an electroless or electrolytic deposition technique. Accordingly, blistering or delamination of core material 40 may be avoided during reflow operations in which controlled chip collapse connections (C4) solder bumps are formed or chip capacitors are attached.

Figure 3:
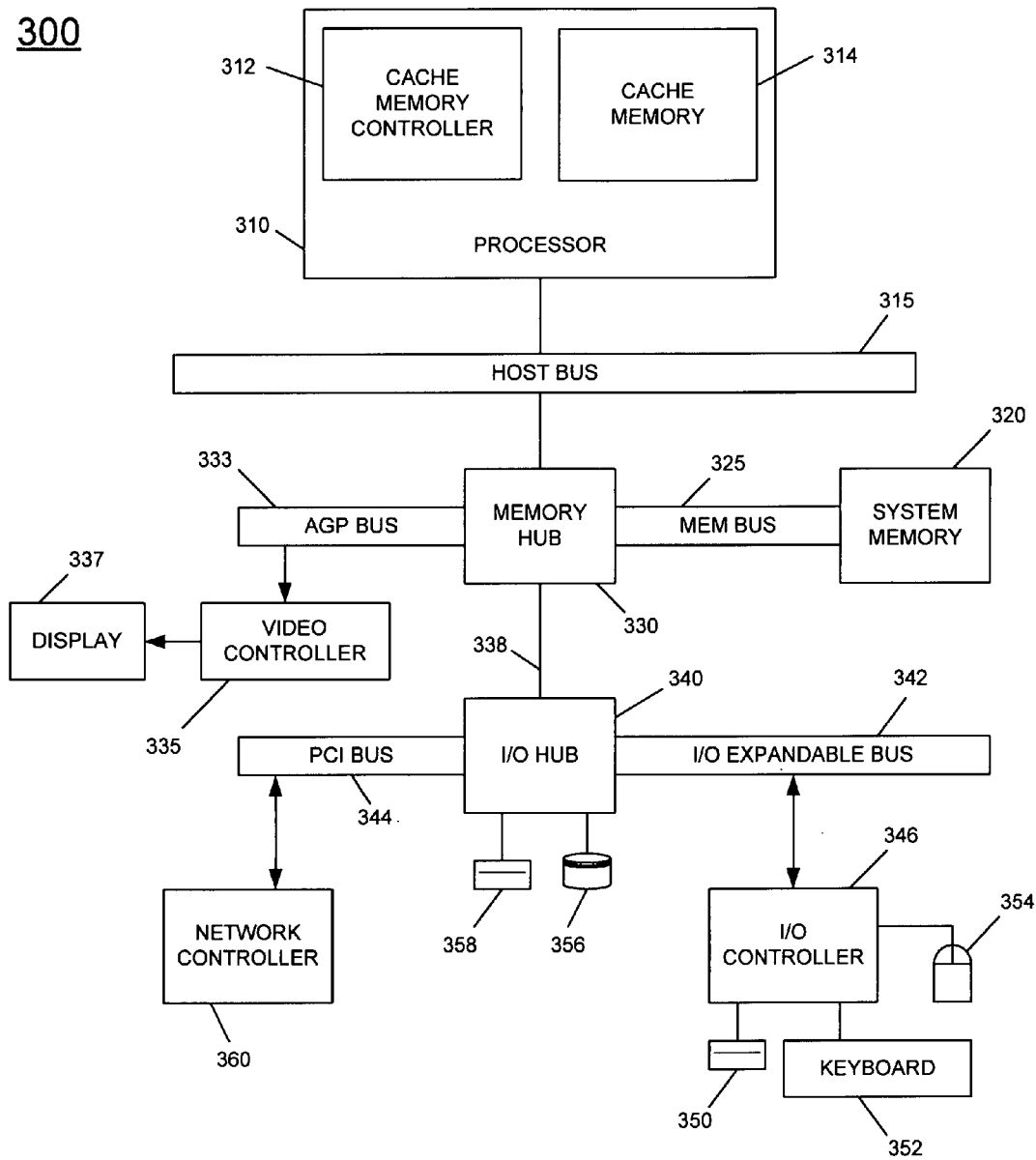
FIG. 3 is a block diagram of a computer system in accordance with one embodiment of the present invention.

Semiconductor packages having a core material formed in accordance with an embodiment may be used in various systems. FIG. 3 is a block diagram of a computer system 300 in which embodiments of the invention may be used. As used herein, the term "computer system" may refer to any type of processor-based system, such as a notebook computer, a server computer, a laptop computer, or the like.

Now referring to FIG. 3, in one embodiment, computer system 300 includes a processor 310, which may include a general-purpose or special-purpose processor such as a microprocessor, microcontroller, a programmable gate array, and the like. Processor 310 may include a cache memory controller 312 and a cache memory 314. Processor 310 may be coupled over a host bus 315 to a memory hub 330 in one embodiment, which may be coupled to a system memory 320 (e.g., a dynamic RAM) via a memory bus 325. Memory hub 330 may also be coupled over an Advanced Graphics Port (AGP) bus 333 to a video controller 335, which may be coupled to a display 337.

Memory hub 330 may also be coupled (via a hub link 338) to an input/output (I/O) hub 340 that is coupled to an input/output (I/O) expansion bus 342 and a Peripheral Component Interconnect (PCI) bus 344, as defined by the PCI Local Bus Specification, Production Version, Revision 2.1 dated June 1995. In one embodiment, processor 310 (at least) may be adapted in a package having a package substrate with a core material in accordance with an embodiment of the present invention and coupled, e.g., through a socket to a circuit board of system 300.

I/O expansion bus 342 may be coupled to an I/O controller 346 that controls access to one or more I/O devices. As shown in FIG. 3, these devices may include in one embodiment storage devices, such as a floppy disk drive 350 and input devices, such as a keyboard 352 and a mouse 354. I/O hub 340 may also be coupled to, for example, a hard disk drive 358 and a compact disc (CD) drive 356, as shown in FIG. 3. It is to be understood that other storage media may also be included in the system.

PCI bus 344 may also be coupled to various components including, for example, a network controller 360 that is coupled to a network port (not shown). Additional devices may be coupled to the I/O expansion bus 342 and the PCI bus 344. Although the description makes reference to specific components of system 300, it is contemplated that numerous modifications and variations of the described and illustrated embodiments may be possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a substrate including a core material, the core material formed with a filler including aluminum trihydrate and a secondary filler material including a clay material, wherein the secondary filler material can trap water released by the aluminum trihydrate at a solder reflow temperature to which the substrate is subjected,
wherein (a) the secondary filler material is to prevent water of hydration of a secondary decomposition reaction from delaminating the core material and (b) the substrate includes a plurality of vias extending through the core material to contact at least one conductive layer of a first plurality of build up layers on a first side of the core material and at least one conductive layer of a second plurality of build up layers on a second side of the core material, and a plurality of solder bumps, wherein the solder bumps are formed by a solder reflow process that occurs at the solder reflow temperature, and (c) the core material is halogen free.

2. The apparatus of claim 1, wherein the core material is not delaminated after the solder reflow process.

3. An apparatus comprising:
a package substrate including a core material, the core material formed from aluminum trihydrate coated with a polymer material, comprising polyisocyanurate, that is to prevent or to reduce a secondary decomposition reaction of the aluminum trihydrate at a solder reflow temperature at which a solder reflow process occurs.

4. The apparatus of claim 3, wherein the package substrate includes a plurality of vias extending through the package substrate to contact at least one conductive layer of a first plurality of build up layers on a first side of the core material and at least one conductive layer of a second plurality of build up layers on a second side of the core material, and a plurality of solder bumps, wherein the solder bumps are formed by the solder reflow process that occurs at the solder reflow temperature, wherein the secondary decomposition reaction does not occur at the solder reflow temperature.

5. The apparatus of claim 3, wherein the core material is not delaminated after the solder reflow process.

6. The apparatus of claim 3, wherein the package substrate includes a semiconductor package substrate.

7. The apparatus of claim 1, wherein the solder reflow temperature is generally between 240 and 265 degrees and the core material is not delaminated after the solder reflow process.

8. The apparatus of claim 3, wherein the solder reflow temperature is generally between 240 and 265 degrees and the core material is not delaminated after the solder reflow process.

9. The apparatus of claim 3, wherein the polymer material is configured to reduce the secondary decomposition reaction of the aluminum trihydrate at the solder reflow temperature.

\* \* \* \* \*